E. B. HACK.
STAMP BATTERY AND THE LIKE.
APPLICATION FILED APR. 3, 1922.

1,437,515.

Patented Dec. 5, 1922.

Inventor.
Ernest Barton Hack
By Louis Prevost Whitaker atty.

Patented Dec. 5, 1922.

1,437,515

UNITED STATES PATENT OFFICE.

ERNEST BARTON HACK, OF WESTMINSTER, LONDON, ENGLAND, ASSIGNOR OF ONE-HALF TO GEORGE MOWLEM BURT, OF WESTMINSTER, LONDON, ENGLAND.

STAMP BATTERY AND THE LIKE.

Application filed April 3, 1922. Serial No. 548,947.

*To all whom it may concern:*

Be it known that I, ERNEST BARTON HACK, a subject of the King of Great Britain, residing at Grosvenor Wharf, Westminster, London, England, have invented new and useful Improvements Relating to Stamp Batteries and the like, of which the following is a specification.

This invention relates to machines or apparatus for pulverizing, crushing, stamping and other operations performed by falling weights mounted on vertical sliding stems or rods which are lifted by rotating cams acting against tappets thereon, of the kind in which the stems are raised clear of the cams by pivoted hooks or pawls designed to engage with lugs or shoulders on the said stems.

In mechanism of this kind independent means have been employed for lifting the pivoted hooks or pawls when in engagement with the lugs in the stems in order to raise the latter clear of the actuating cams and the object of this invention is to dispense with such independent mechanism.

According to the invention lifting means for the pivoted hooks or pawls are combined with means for engaging the said hooks with the lugs on the stems in such a manner that they can be simultaneously operated by a single controlling device.

In a suitable arrangement for carrying out the invention a double-armed lever having arms of unequal length is provided from which depend a pair of rods pivoted one on each side of the lever fulcrum, the rod pivoted to the shorter arm has pivoted to its lower end the lifting hook and serves to raise and lower the same, whilst the other rod, which is pivoted to the longer arm, is connected to the said hook through the medium of a bell-crank lever and a link and serves to move the lifting hook on its pivot so as to place it into or remove it from the path of the lug on the stamp stem. The longer arm of the double-armed lever normally overbalances the shorter arm or is weighted for this purpose so as to place the lifting hook into the path of the lug on the stamp stem and raise the said hook to lift the said stem clear of the operating cam. Means such as a guided rod connected by a chain passing around guide pulleys to the longer arm of the double-armed lever serve to operate the said lever to lower the lifting hook and remove it out of the path of the stamp stem so that the latter will be lowered on to its operating cam.

To enable the invention to be fully understood, I will describe it by reference to the accompanying drawing in which:—

$a$ is the framing of the stamp battery and $b$ indicates one of the vertical stamp stems or rods sliding in guides $c$ on the said framing. $d$ is the tappet on the stem $b$ and $e$ the rotating cam designed to co-act with the said tappet to raise the stem and then allow it to fall to effect the crushing or stamping operation, $f$ is the lug on the tappet and $g$ the pivoted lifting hook designed to engage therewith to lift the stem and hold it clear of the cam $e$, as indicated in Figure 1.

$h$ is the double-armed lever fulcrumed to the frame $a$ by means of trunnion pins $i$ on the lever engaging recesses $j$ in the bearing block $k$. $l$ is the rod pivoted to the short arm $h^1$ of the lever $h$ and carrying at its lower end the pivoted lifting hook $g$. $m$ is the rod pivoted to the long arm $h^2$ of the lever $h$ and $n$, and $o$ are the bell-crank lever and the link, respectively, for connecting the said rod to the said lifting hook $g$, the lever $n$ being fulcrumed to a bracket on line 24 the frame $a$ at $p$. $q$ is the guided rod for operating the lever $h$, the said rod sliding in a slotted hole in a block $r$ and being connected to the arm $h^2$ of the lever $h$ by the chain or the like $s$ passing over the guide pulleys $t$. $u$ is a stop on the rod $q$ in the form of a pin projecting on either side of the said rod and serving when drawn down through the slotted hole in the block $r$ to be turned transversely to the said hole to hold the lever $h$ in the position shown in Figure 2. $h^3$ is the weight on the arm $h^2$ of the lever $h$.

Figure 1:
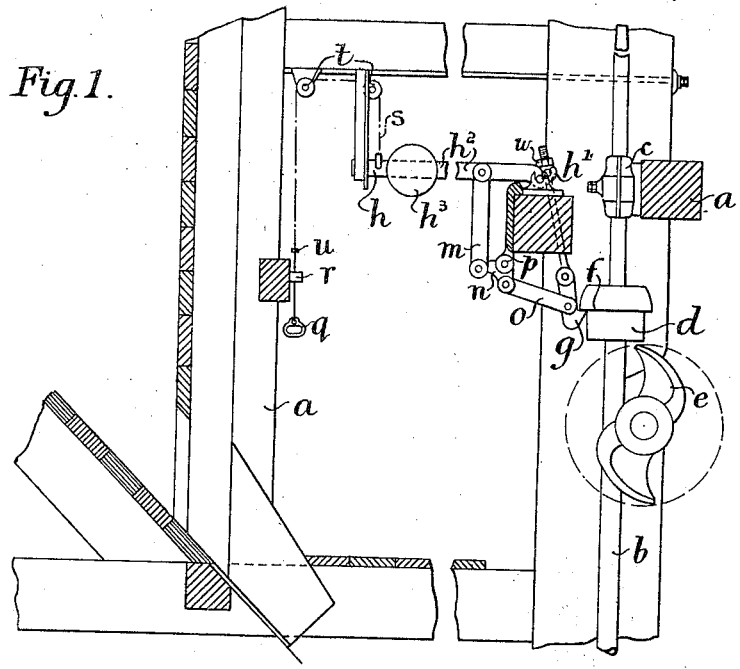
Figure 1 is a side view of a portion of the framing of a stamp battery showing the stem of one of the stamps therefor and its operating cam and means in accordance with the invention for lifting and holding the said stem clear of the said cam, the parts being shown in the said lifted position.
Figure 3:
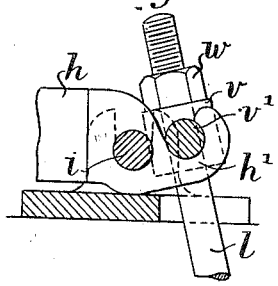
Figures 3 and 4 are, respectively, a sectional side view and a plan of a portion of the double-armed lever and the pivot joint between the short arm of the said lever and the rod carrying the lifting hook.
Figure 2:
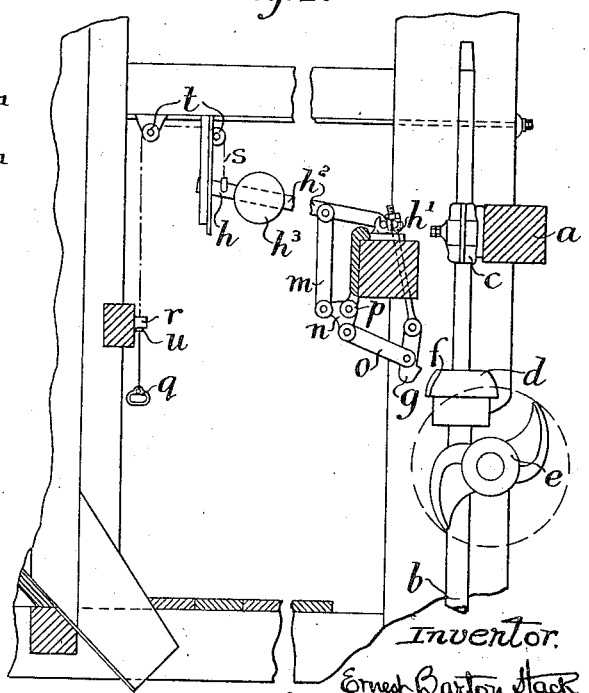
Figure 2 is a similar view to Figure 1 but showing the lifting hook in the disengaged position.

Assuming the parts to be in the position shown in Figure 2, but with the stem $b$ raised to its highest position by the cam $e$, by pushing up the rod $q$ it will be understood that the lever $h$ will be allowed to rock on its fulcrum under the influence of the weight $h^3$ so that its long arm $h^2$ will be lowered and move the hook $g$ below the lug $f$, whilst the short arm $h^1$ will be raised and consequently raise the said hook into contact with the said lug $f$, so that the tappet $d$ will be raised clear of the cam $e$, as indicated in Figure 1. To lower the tappet $d$ from its raised position again into contact with the cam $e$ the rod $q$ must be pulled down, when it will be seen that the short arm $h^1$ of the lever $h$ will be lowered to lower the hook $g$, at the same time the long arm $h^2$ will be raised and remove the said hook out of the path of the lug $f$ on the tappet $d$.

Figure 4:
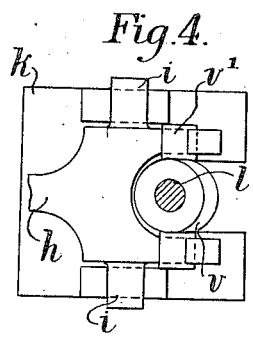

As, in course of time, the underside of the tappet will wear away owing to the rubbing action of the cam $e$ so that the lug $f$ will be lowered relatively to the hook $g$, provision is made for correspondingly lowering the said hook. This is advantageously effected by employing a block $v$ having trunnions $v^1$ to pivot the rod $l$ to the lever $h$ which is bifurcated as shown in Figure 4, the said rod passing through a hole in the said block and having a nut $w$ screwed thereon by which the required adjustment can be made.

Although the invention has been described in connection with stamp batteries it is to be understood that it is equally applicable to all machines where vertically sliding weighted rods having operating tools at their lower ends are raised and allowed to fall to cause such tools to function.

Having now particularly described and ascertained the nature of my said invention and in what manner the same is to be performed, I declare that what I claim is:—

1. Lifting mechanism for the rising and falling stems of stamp batteries and the like, comprising a double armed controlling lever, a lifting hook connected to said lever on one side of its fulcrum, for raising and lowering said hook, and connections from said lifting hook to said lever on the other side of its fulcrum for moving said hook into and out of operative relation with the stem.

2. Lifting mechanism for the rising and falling stems of stamp batteries and the like, comprising a double armed controlling lever, a lifting hook connected to said lever on one side of its fulcrum, for raising and lowering said hook, and connections from said lifting hook to said lever on the other side of its fulcrum for moving said hook into and out of operative relation with the stem, and means for vertically adjusting said lifting hook with respect to its connection with said lever to accommodate wear on the stem tappet.

3. Lifting mechanism for the rising and falling stems of stamp batteries and the like, comprising a double armed operating lever, a lifting hook connected with the short arm of said lever and movable horizontally into and out of operative relation with the stem, a bell crank pivoted to a part in stationary relation with the fulcrum of said double armed lever, a link connecting one arm of the bell crank to the lifting hook, and a link connecting the other arm of said bell crank to the long arm of said double armed lever.

4. Lifting mechanism for the rising and falling stems of stamp batteries and the like, comprising a double armed operating lever, a lifting hook having a part for engaging a projection on the stem tappet, a supporting connection between said hook and the short arm of said lever, connections including a bell crank and links between said hook and the long arm of said lever for moving the hook laterally into and out of engagement with the tappet projection simultaneously with the vertical movement of the hook, a weight on said double armed lever for moving it in one direction, and operating means for moving it in the opposite direction.

5. Lifting mechanism for the rising and falling stems of stamp batteries and the like, comprising a double armed operating lever, a lifting hook having a part for engaging a projection on the stem tappet, a supporting connection between said hook and the short arm of said lever, connections including a bell crank and links between said hook and the long arm of said lever for moving the hook laterally into and out of engagement with the tappet projection simultaneously with the vertical movement of the hook, a weight on said double armed lever for moving it in one direction, operating means for moving the lever against the action of the weight, and a securing device for said operating means.

6. Lifting mechanism for the rising and falling stems of stamp batteries and the like, comprising a double armed lever, a lifting hook provided with a part for engaging a projection on the stem tappet, a longitudinally adjustable device for connecting said hook with one arm of the operating lever, a bell crank pivoted to a part in fixed relation with the fulcrum of the operating lever, a horizontally disposed link, connecting one arm of the bell crank to said hook, a vertically disposed link connecting the other arm of the bell crank to the operating lever on the opposite side of its fulcrum from said adjustable connection, a weight on said operating lever normally holding it in such position as to hold the lifting hook in raised position, and in operative relation with the stem, and hand operated means for moving said lever against the action of said weight, to lower said hook and withdraw it from said operative position, with respect to the stem tappet, and means for holding the parts in said position.

7. Lifting mechanism for the rising and falling stems of stamp batteries and the like, comprising a double armed operating lever provided on one side of its fulcrum with bifurcated hook shaped portions, a lifting hook, a lifting rod pivotally connected with said hook, a trunnion block provided with an aperture engaging said rod, and with trunnions engaging the bifurcated hook shaped portions of said lever, an adjustable connection on said rod engaging the trunnion block for adjusting said lifting hook vertically and connections from the lifting hook to said lever on the opposite side of its fulcrum for moving said lever into and out of operative relation with the stem tappet and simultaneously raising and lowering the hook.

ERNEST BARTON HACK.